March 7, 1967 C. L. COWAN ETAL 3,308,296
HIDDEN EXPLOSIVES DETECTOR UTILIZING LONG-LIVED
RADIOACTIVE TRACER MATERIAL
Filed March 20, 1964 3 Sheets-Sheet 1
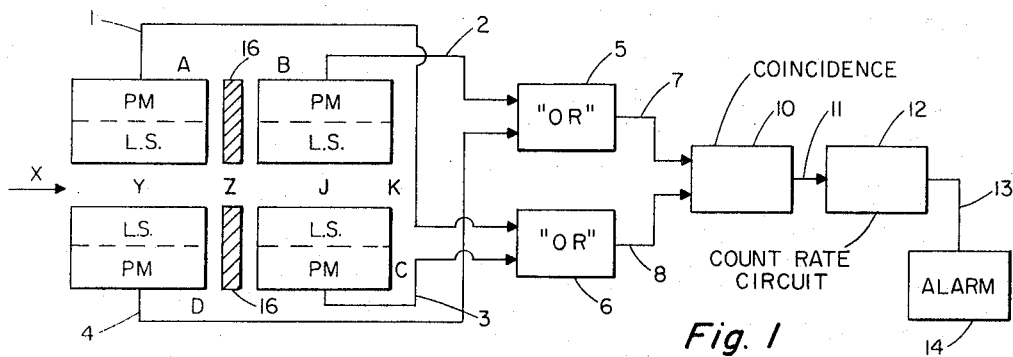
Fig. 1
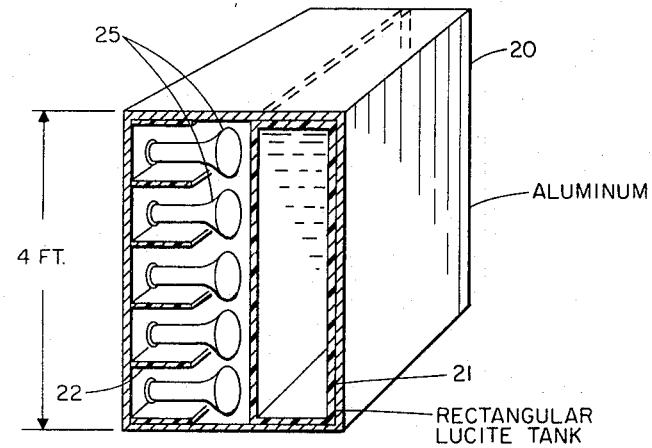
Fig. 2
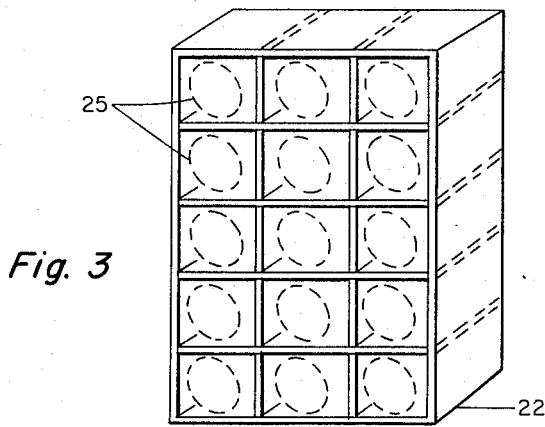
Fig. 3
Fig. 4
INVENTOR.
EDWARD D. JORDAN
CLYDE L. COWAN
BY 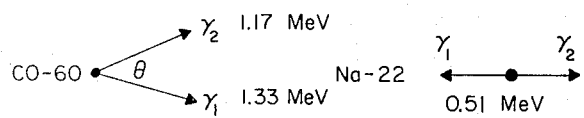

March 7, 1967

C. L. COWAN ETAL 3,308,296

HIDDEN EXPLOSIVES DETECTOR UTILIZING LONG-LIVED
RADIOACTIVE TRACER MATERIAL

Filed March 20, 1964

INVENTORS
EDWARD D. JORDAN
BY  CLYDE L. COWAN

United States Patent Office 3,308,296
Patented Mar. 7, 1967

3,308,296
HIDDEN EXPLOSIVES DETECTOR UTILIZING LONG-LIVED RADIOACTIVE TRACER MATERIAL
Clyde L. Cowan, Rockville, and Edward D. Jordan, Kensington, Md., assignors to the United States of America as represented by the United States Atomic Energy Commission
Filed Mar. 20, 1964, Ser. No. 353,643
5 Claims. (Cl. 250—71.5)

This invention relates to radiation detection and more particularly relates to the method and apparatus for detecting radioactive-seeded detonator caps or explosives which may be carried on a person or in luggage.

In recent years bombs have been placed aboard airplanes for destroying the airplane in flight. Accordingly, a need has been clearly indicated for an apparatus and method which will detect such explosives prior to take off.

In copending application, Serial No. 157,051 filed on December 1, 1961, now Patent No. 3,146,349 such explosives are detected by seeding the entire supply of dynamite with boron and by irradiating the luggage with thermal neutrons from a neutron source prior to loading of the airplane. The boron seeded dynamite in the bomb when irradiated with thermal neutrons, as the concealed bomb moves past the neutron source, is activated to emit gamma rays which are then detected to indicate the presence of the bomb in the luggage. However, this method has several limitations particularly as applied to persons carrying the bomb since the biological tolerance level of living tissues for neutrons is low.

The use of radioactive tracers in medicine, fluid flow measurements and other fields are well known. Generally these applications are carried out by experienced individuals under controlled conditions for a single experiment.

To apply such tracer techniques to the detection of explosives presents a number of problems. A health and safety problem would exist because such explosives are handled in great quantities by farmers, road builders and others who may take no precautions even if warned. If a warning is given, the bomb carrier may attempt to shield his bomb on his person or within his suitcase to escape detection. The device must be capable of accurate rapid examination of luggage and individuals of varying size and shape without requiring an opening of the luggage and must operate even if shielding has been attempted. In addition the device should preferably be insensitive to background radiation including that resulting from common radioactive articles such as luminescent watches and clocks.

Accordingly, it is an object of this invention to provide an improved bomb detection apparatus and method.

It is another object to provide a method and apparatus which will reliably detect bombs without developing a health and safety problem.

Another object is to detect radioactive explosives in the presence of background radiation.

A further object is to detect small-size bombs within containers of various larger sizes and different shapes.

Another object is to provide an inexpensive method for tagging explosives while yet providing reliable detection of such explosives when hidden and/or shielded.

The solution of these problems by my invention and the other objects and advantages thereof will be apparent to those skilled in the art from a reading of the detailed description of my invention.

In this invention the supply of dynamite caps is seeded with a radioactive isotope of very low activity to avoid health and safety problems. The preferred isotopes are gamma emitters which radiate two gamma rays of substantially the same energy substantially simultaneously in a cascade disintegration. The luggage or individuals pass down a pathway for examination with two large liquid scintillator detectors on each side. The electrical output of diagonally opposite detectors is connected to a first OR circuit; the other detectors are similarly connected to a second OR circuit. The outputs from the OR circuit are connected to the input of a coincidence circuit through high and low level discriminator circuits. The output of the coincidence circuit is connected to a count rate meter and alarm circuitry.

Thus while the radiation emitted from the hidden bomb may be quite small as a result of the low activity isotope, attempted shielding, and the position of the bomb within the luggage, the gamma rays detection is maximized by the use of the large scintillator detectors, by requiring coincidence, by counting only those rays emitted from the bomb to the exclusion of background and by connecting the detectors so that the gamma rays from the ends and sides of the luggage may be received and counted.

For a better understanding of the preferred embodiment of my invention together with other objects thereof, reference is made to the following description taken in connection with the accompanying drawings of which:

FIG. 1 is a block diagram of the electrical circuitry of my invention in its broadest form.

FIG. 2 shows one detector with its side removed to show the large scintillator tank and position of the photomultipliers.

FIG. 3 shows a front perspective view of a rack which supports the photomultipliers in the detector.

FIG. 4 is an illustration of gamma emission from cobalt-60 and sodium-22.

Figure 5:
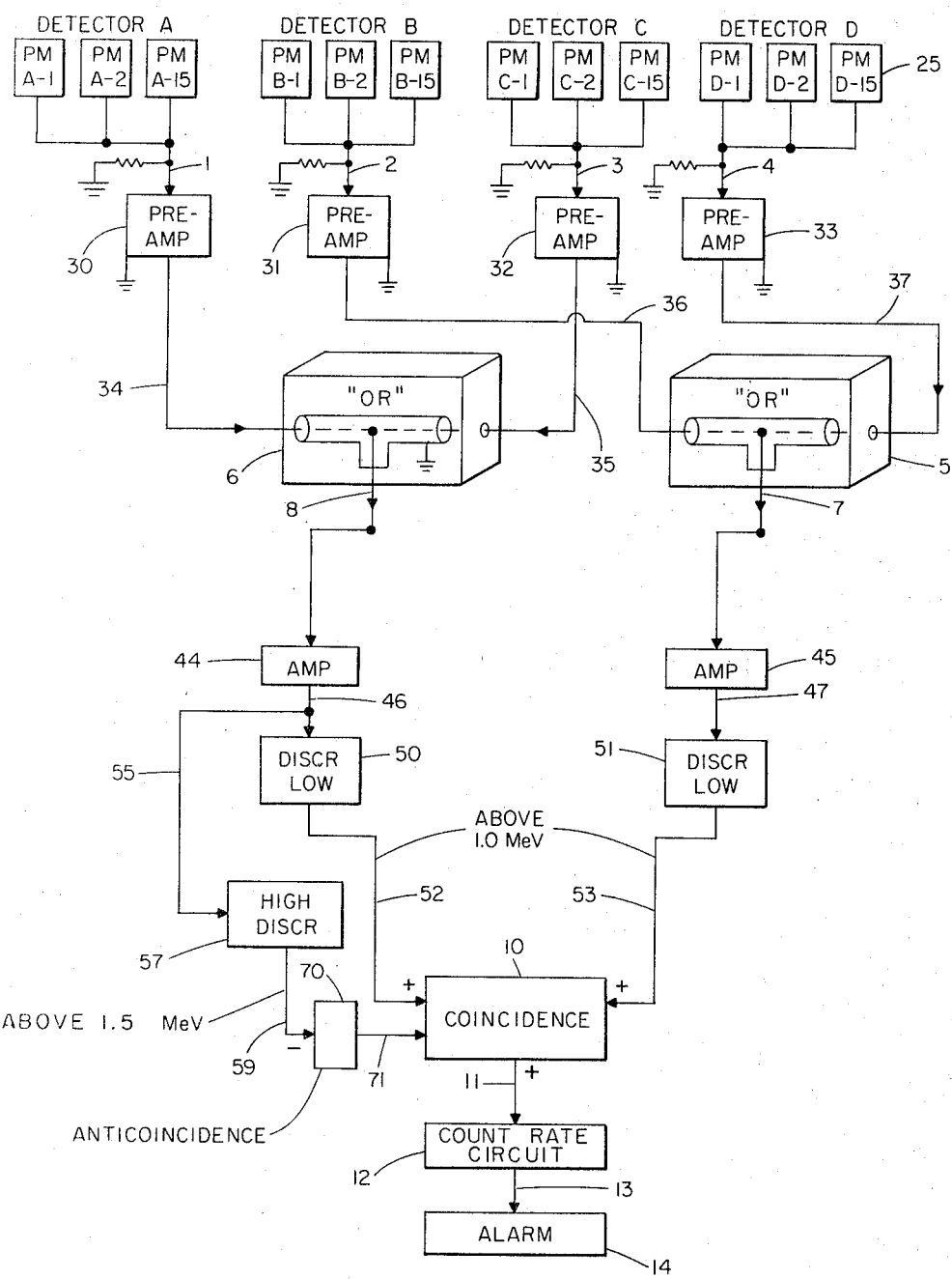

FIG. 5 of a complete block diagram of the electrical circuitry of my invention.

Figure 6:
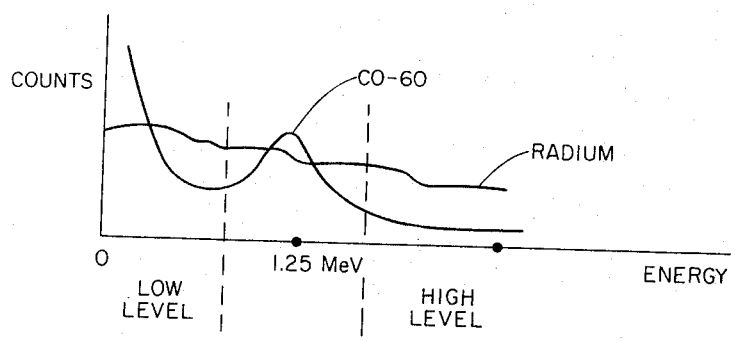

FIG. 6 is a graph showing the gamma ray emission by Co-60 and radium to illustrate the effect of high and low level discrimination.

Figure 7:
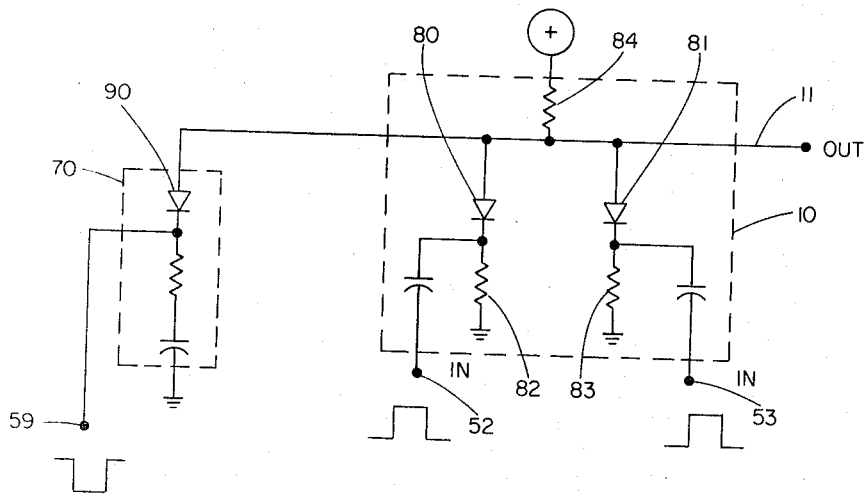

FIG. 7 is a schematic diagram of the coincidence circuit and anti-coincidence circuits of FIG. 5.

In FIG. 1, an arrow indicates the direction of travel of a person or suitcase to be examined for bombs. In the preferred form of this invention the dynamite caps are seeded by the manufacturer with a radioactive isotope in an amount of 0.1–0.25 microcurie per cap or less. This activity is about 25% or less of the activity in a conventional luminescent watch so that no health or safety problem is presented.

The preferred radioactive isotope in the cap is a gamma emitter which substantially simultaneously emits two gamma rays of substantially the same energy. Cobalt 60 is such an isotope and emits a 1.17 mev. and 1.33 mev. gamma ray in cascade disintegration within $10^{-12}$ seconds of each other. Sodium 22 is another such tracer which simultaneously emits two 0.51 mev. gamma rays. Gamma rays are very penetrating, and the use of a gamma emitting isotope as a tracer in the bomb cap virtually assures that an effective bomb can not easily be shielded from the detector.

Isotopic tagging or seeding of the explosive cap may be performed by a number of methods. One method is to tag the steel protective shell of such bomb caps by exposing them to radiation from a fission reactor for a few minutes. Another is to paint the inside of the shell with a radioactive paint. Thus, the cobalt normally present in such steel is made radioactive.

Four large liquid scintillator tank detectors A, B, C, and D are shown positioned on both sides of the path of luggage or a person which is to be examined. Each detector includes a liquid scintillator L.S. and fifteen photomultipliers P.M. The liquid scintillator includes a decahydronaphthalene (Decalin) solvent and a primary solute 2,5-diphenyloxazole (PPO) (2 grams/liter) and a secondary solute 1,4-bis[2-(4-methyl-5-phenyloxazole)] benzene (referred to as demethyl POPOP) (.05 gram/liter) and a wave band shifter p-terphenyl (1 gram/liter).

Upon activation by gamma radiation, the liquid scintillator emits light flashes at a wavelength of approximately 4300 Angstroms. The electrical output of the photomultiplier is directly proportional to the energy of the gamma ray absorbed in the scintillator.

The light flashes from the liquid scintillators are impressed upon the photomultiplier cathode to provide electrical output pulses. The photoemissive cathode is matched to the liquid scintillator and provides maximum output current at approx. 4300 Angstroms.

The four detectors A, B, C, and D are arranged with two on each side of the path of travel of the person and/or luggage. Two diagonally opposite detectors A and C are connected to have the electrical outputs of their photomultipliers connected over lines 1 and 3 to the inputs of a first OR circuit 6. Diagonally opposite detectors B and D have their electrical outputs connected on lines 2 and 4 to second OR circuit 5. The electrical outputs of the two OR circuits are connected on lines 7 and 8 to the inputs of an amplifier and then fed to coincidence circuit 10. The output of the coincidence circuit on line 11 connects to the input of a count rate meter 12. An electrical output is provided on line 13 to operate alarm 14, after a predetermined count rate. The alarm system may be reset after being tripped either manually or automatically. The coincidence circuit will provide an output if there is either one or two inputs into both "OR" circuits.

The bomb detection circuitry as described above operates an alarm only if the total number of coincident pulses received during the passage of the luggage between the detectors exceeds a predetermined number which is above the maximum background level at an installation.

The radiation from the seeded explosive may be very small compared to electronic noise, cosmic radiation, radioactive watches and other background sources because of the low activity seeding of the cap, the position of the bomb in the luggage and any attempted shielding of the bomb. Therefore, the apparatus of FIG. 1 is designed to maximize the effect of gamma rays from the bomb and minimize the effect of these other factors. For example lead blocks 16 are positioned on the sides and between the detectors to prevent background radiation from passing through two detectors. The presence of a luminescent clock in the luggage may cause some coincident gamma radiation, but this effect is negated by the discriminator circuitry included in FIGS. 5 and 6. Since gamma rays are directional and since the direction of any two coincident gamma ray photons from the bomb may be random, the liquid scintillators have a broad surface (4' high, 2' wide) facing the path of travel so as to detect as many of these coincident photons as possible for various size objects.

In operation if we designate $\gamma_1$ and $\gamma_2$ as the two photons emitted by the bomb as a suitcase approaches the detectors at X and if we assume $\gamma_1$ reaches detector A, there is a high probability that $\gamma_2$ will reach detector D if the detectors are sufficiently large. Thus when signals are received at both detectors, signals will appear on lines 7 and 8 substantially in coincidence to produce an output on line 11 to counter 12.

When the suitcase is in position Y similar operation will occur to result in a count at 12.

When the suitcase is in position Z if $\gamma_1$ is directed at detector A, $\gamma_2$ may be directed at detector C which will result in addition of the pulses at 6 but no count, or $\gamma_2$ may be directed at detectors B and D to produce a signal at 7 and result in a count at 12.

The operation of the circuit with the suitcase at J and at K is the same as at X and Y.

Now while, as described above, there is probability that $\gamma_2$ will reach the detector D when $\gamma_1$ is directed at detector A, there is a good probability that $\gamma_2$ will reach detector B and thus result in a count. Thus the detector circuit is connected so that when one detector receives $\gamma_1$ as a result of the disintegration to the first energy state, the receipt of $\gamma_2$ by either the detector along side or across from the one detector will result in a count.

The advantages of this circuitry are many. First, it uses only four detectors but is able to count pulses received by four detectors in coincidence thereby providing a fairly large total count considering the low activity in the cap. In addition, the circuitry has examined the bag on the front and back and both sides. In addition, if the suitcase contained a high absorption material on one side, so as to prevent gamma rays from reaching both A and B, emitted gamma rays would be received and counted as a result of pulses at D and C.

FIG. 2 shows a large liquid scintillator detector of the type shown as A, B, C, and D in FIG. 1. One side has been removed from the closed aluminum enclosure 20. Within the aluminum enclosure on the front face in a closed, rectangular, clear, acrylic, resin ("Lucite"), tank 21 which contains the liquid scintillator. On the back face of the detector there is a "Lucite" rack 22, which is more clearly shown in FIG. 3.

The rack of FIG. 3 includes five (5) horizontal and three (3) vertical shelves or partitions for mounting 15 photomultipliers 25. The ends of the photomultipliers containing the photoemissive cathodes are substantially flush against the back of the scintillator tank with a thin layer of silicon grease between the tube and tank which acts as a light coupler.

The operation of liquid scintillators in response to charged particles or gamma rays is well known. They conventionally include a light type box, a container having an activated solution, one or more solutes, a light reflector and photomultipliers. Gamma rays during their passage through the liquid give rise to secondary charged particles. The charged particles excite the molecules of the liquid which subsequently lose the energy of excitation in the form of light. Accordingly, the liquid container volume is made sufficiently large so that the impinging gamma ray will yield virtually all of its energy in the liquid by multiple collisions.

The amount of light emitted by the above process is very small thus requiring that the liquid transmit the light to the photomultipliers with very little absorption. Consequently the walls of the container usually have a highly reflective coating or covering, the liquid is very pure and the secondary solutes are added to shift the wavelength of the light to one which experiences less attenuation.

Since metal containers tend to contaminate the scintillation solution, in this invention the tank container 21 is made of clear plastic or glass and is completely sealed and enclosed. However, previously known scintillation solutions attack plexiglass tanks especially when in the strained condition. In this invention therefor activated decahydronaphthalene is used as the scintillation solution. This solution does not readily attack the Plexiglas tank.

FIG. 4 is a vector diagram illustrating the isotropic emission of $\gamma_1$ and $\gamma_2$ from cobalt-60. Gamma radiation is similar to light radiation in that any one photon is very directional even though the total radiation from the isotope may be omni-directional. With an isotropic isotope, after $\gamma_1$ is emitted there is an approximately equal probability that $\gamma_2$ will be emitted at an angle $\theta$ within 360 degrees. Sodium-22 on the other hand is a positron emitter in which the emitted positron is annihilated by an electron to emit simultaneously $\gamma_1$ and $\gamma_2$ which are displaced 180 degrees in phase with respect to each other.

In FIG. 5 there is shown a complete block diagram of my invention, in which the elements common to FIG. 1 are similarly legended. Thus, the photomultiplier outputs from the detectors A, B, C, and D after being sent through pre-amps on lines 1-4 are connected to "OR" circuits 5 and 6 to produce outputs on lines 7 and 8 to detect and count coincidences at 10 and 12.

In addition, FIG. 5 includes additional amplifiers, high and low level discriminators and an anti-coincidence circuit for reasons presently to be described.

On lines 1–4 there are electrical output pulses of the order of 100/sec. resulting from light scintillated pulses hitting the photoemissive cathodes and the resulting multiplication. These pulses which are the sum of the 15 photo tubes currents are then dropped across a common load resistor to give voltage pulses. (This is a common load resistor for the 15 photomultiplier tubes. If this resistor were not there, the photo tubes would cut off. This load resistor is between the input to the pre-amp and ground.) The voltage pulses are amplified in pre-amplifiers 30–33, the outputs of which on lines 34–37 are connected to "OR" circuits 5 and 6.

The "OR" circuits 5 and 6 are each a coaxial T-line in which lines 34 and 35, and 36 and 37 connect at opposite ends to the inner conductor of the coaxial; the other coaxial conductor is grounded. The inner conductors of the coaxial are connected to the output leads 7 and 8.

When there is a voltage pulse on either line 36 or 37, for example, that pulse will appear on line 7. In addition, if pulses exist simultaneously on 36 and 37, the sum of the two appear at 7.

The pulses at 7 and 8 are further amplified at 44 and 45 to produce pulses on lines 46 and 47.

The pulses on lines 46 and 47 are connected to low-level discriminators 50 and 51 which pass only those pulses which represent a gamma ray energy of greater than 1.0 m.e.v. for reasons more fully described subsequently in reference to FIG. 6. These low level discriminators include a multivibrator (not shown) which is adjustably biased below its firing point. Thus, for small valued input pulses on lines 46 and 47 which represent gamma rays of less than 1.0 m.e.v., it is insufficient to fire the multivibrator and there is no output on line 52 or 53. For input pulses greater than 1.0 m.e.v., the discriminator threshold bias on the multivibrator is overcome, the multivibrator fires and a fixed amplitude positive pulse is transmitted on lines 52 and 53. Thus regardless of the output amplitude from the "OR" circuits the discriminator output is a fixed amplitude pulse.

The pulses from amplifiers 44 and 45 are also connected on line 55 to a high level discriminator 57 which produces a pulse on line 59 only for pulses representing gamma energy greater than 1.5 m.e.v. for example. The high level discriminator is substantially the same as the low level discriminator with a few modifications, so that an output pulse is provided from the high level discriminator when the amplitude of the input pulse on line 55 exceeds a value representing 1.5 m.e.v. gamma. For example, high level discriminator 57 has a multivibrator (M.V.) which has the tube normally conducting with a positive bias. A gamma ray which is greater than 1.5 m.e.v. produces a negative pulse on line 55 which is sufficient to overcome the positive bias and cut off the normally conducting tube. Thus a positive output pulse is provided on line 59 for every gamma ray above 1.5 m.e.v.

Thus, in normal operation pulses on lines 52 and 53 which occur within about $10^{-6}$ sec. of each other and which represent gamma rays having an energy above 1.0 m.e.v. are compared in coincidence detector 10 to provide an output pulse to count rate meter 12 which will operate an alarm when the count rate exceeds a predetermined value thereby indicating the presence of seeded dynamite. However, should the pulses on lines 52 and 53 represent energy above 1.5 m.e.v., pulses will exist on line 59 from the high level discriminator; these pulses at 59 will control anti-coincidence circuits 70 to produce output pulses on lines 71 which negates the effect of pulses on 52 and 53.

Thus counter 12 counts the rate of only those pulses where coincidence has occurred and in which the energy of the pulses is between a low and high limit which in the illustrated example is 1.0 and 1.5 m.e.v.

The reasons for the high and low level discrimination will be apparent from the graph of FIG. 6. This graph shows that while cobalt-60 has a peak gamma radiation at an average value of 1.25 m.e.v. (based upon the 1.17 and 1.33 m.e.v.) there is substantial radiation at lower energies. Since it is not desired to detect radioactive illuminated watches and clocks within the suitcase, FIG. 6 shows the gamma ray emission characteristic for a radium coated clock indicator. By providing the high level discrimination previously described much of this effect is negated. It should also be noted that while radium does have a broad spectrum of emission and does emit radiation having energy between the detectable limits of 1.0 and 1.5 m.e.v. that no count is recorded, unless there is also coincidence between pulses from two detectors. By using cobalt-60 or Na-22 which emit 2 gamma rays in rapid succession ($10^{-12}$ seconds) both of these requirements are met and a count is registered. While radium may emit some gamma rays in coincidence, it is a very small percentage of the radiation from radium and may be neglected.

FIG. 7 is a schematic diagram of the coincidence circuit 10 and anti-coincidence circuit 70.

The normal operation of the coincidence circuit has diodes 80 and 81 each normally conducting through a 1 Kohm resistor, 82 and 83 respectively to a 56 Kohm load resistor 84 to a voltage source of +120 volts. Normally the coincident output voltage pulse on line 11 is substantially at ground potential because of the low value of resistors 82 and 83.

The presence of a positive input pulse on either lines 52 or 53 shuts off the associated diode. If only one such is present, at 52 for example, diode 80 is cut off. However, the voltage at the output is still at ground because diode 81 has remained conducting. Thus there is no output pulse at 11 with only one input pulse.

If positive inputs are substantially simultaneously present at both inputs 52 and 53, both diodes 80 and 81 are cut off, and the output on line 11 starts to rise to the source voltage, thereby giving a positive coincident output pulse on line 11 to the counter.

The coincident output pulse on line 11 is the same value as the input pulses if the amplitude of both inputs are equal; if the amplitude of input pulses are unequal, the output pulse equals the amplitude of the smaller valued input signal. For example, if there is a +5 volt pulse on line 52 and a +5 volt on line 53, both diodes 80 and 81 cut off, the output voltage on line 11 rises rapidly; as soon as the output reaches +5 volt the output voltage rise ceases since any greater increase above 5.0 volts would result in one of the diodes conducting again.

Alternatively if +5 volt input exists at 52 and +10 volt input at 53, both diodes 80 and 81 cease conduction. As the output voltage on line 11 rises positive it reaches +5 volts; if the output voltage tried to rise above +5 volt diode 80 would conduct to limit it to +5.0 volts.

As so far described the output on line 11 are pulses which result from coincidence of pulses above the discriminated low level, 1.0 m.e.v. for example.

The anti-coincidence circuit 70 modifies this result by prohibiting the counting of pulses above a predetermined value, 1.5 m.e.v. for example. The negative input pulses on line 59 are only those pulses above the predetermined 1.5 m.e.v. level. Diode 90 is normally non-conducting because its cathode is connected to a +5 volt D.C. source 93 and output line 11, as previously described, never goes above +5.0 volt. Accordingly, the anti-coincidence circuit normally has no effect on the coincidence circuit. However, if a negative pulse exists at 59 indicating a pulse above 1.5 m.e.v., diode 90 will conduct from the positive source, through resistor 84 line 11 diode 90 to ground through the +5 volt source and input terminals. Thus even though there may be coincidence between pulses at 52 and 53, no output will be provided at 11 to the counter 12.

In referring to coincidence detection throughout this disclosure it is recognized that neither the emitted gamma rays or their detection occur at exactly the same instant of time. In this application, the electronic coincidence circuit will respond to pulses having a time spacing of less than $10^{-6}$ seconds. A faster response will eliminate more background but will require more expensive coincidence equipment. This result is provided by using high and low level discriminators in which the output pulse on lines 52, 53, and 59 is less than 1 microsecond wide. Ideally the width of these pulses would be $10^{-12}$ seconds when cobalt-60 is used as the tracer. It should also be mentioned that the half life of cobalt-60 is approximately 5.3 years since a long half-life is obviously desirable for this present application.

While this apparatus is designed to examine a large number of persons or luggage automatically in sequence or in groups, it will be obvious that the broad concepts of this invention have equal application to single articles and the invention may be practiced manually by methods not necessarily using the apparatus of this invention.

For the purpose of this disclosure the meanings of various terms are stated below. A long-life isotope is one with a half-life greater than one year; low activity means less than one (1) microcurie; substantially simultaneously means less than 1 microsecond time spacing. While in the disclosed embodiment a two gamma emitter is used both having substantially the same energy, it will be appreciated that the discriminators of the two electronic channels may be adjusted to different values to pass gamma rays of substantially different energies. However, for successful bomb detection against both persons and luggage it has been found that the gamma energy should be greater than 1.0 m.e.v.

Having described my invention in one preferred embodiment it will be obvious to those skilled in the art that various modifications may be made and accordingly my invention is described in the following claims.

What is claimed is:

1. Apparatus for detection of explosives hidden on persons or in luggage in which the explosive has been seeded with a long-life low-activity radioactive tracer which simultaneously emits two substantially equal energy gamma rays in cascade and in which the person or luggage moves down a pathway, comprising first and second detectors positioned on one side of the pathway spaced from each other in the direction of movement; third and fourth detectors positioned on the other side of the pathway opposite said first and second detectors respectively; each detector including a large tank having a liquid scintillator, and a plurality of photomultipliers arranged with their photoemissive cathodes positioned adjacent the scintillator tank and their electrical output terminals commonly connected to a single output terminal for each detector; first and second OR circuit means, each having two input terminals and one output terminal for passing a pulse at each of said input terminals to said output terminal, means for connecting the output of the first detector to one input terminal of the first OR circuit, means for connecting the output of the fourth detector to the other input terminal of the first OR circuit; means for connecting the output of the second detector to one input terminal of the second OR circuit; means for connecting the output of the third detector to the other input terminal of the second OR circuit; coincidence detection means having two input terminals and an output terminal; counting means connected to said coincidence output terminal; one low-level amplitude discriminator means having an input connected to the output terminal of the first OR circuit and having an output terminal connected to one of the coincidence input terminals; another low-level amplitude discriminator having an input connected to the output terminal of the second OR circuit and having an output connected to the other coincidence input terminal; one high-level discriminator having an input terminal and an output terminal with the input terminal connected to the output of the first OR circuit; anti-coincidence means connected to said coincidence means and said high-level discriminator for preventing output pulses from said coincidence means when a pulse exists at the output of the high-level discriminator; said high-and-low-level discriminator circuits providing output pulses having a width of less than $10^{-6}$ seconds whereby gamma rays are counted only when in coincidence within a very short time and when the amplitude is between the high and low energy levels; said coincidence circuit includes first and second diodes and said anti-coincidence circuit includes a third diode, means for connecting said three diodes in parallel to said coincidence output terminal, a source of power, a resistor connecting said coincident output terminal to said source of power; said diodes being poled for normally conducting to said source of power; means for biasing said third diode to non-conduction; means for connecting the output of said high-level discriminator circuit for reversing the state of conduction of the third diode; means for connecting one of the coincident input terminals to the first diode and the other coincident input terminal to the second diode for reversing their conductive state upon the occurrence of a pulse at the input terminals whereby the occurrence of pulses at both coincident input terminals will result in a pulse at the coincident output terminal unless a pulse occurs at the anti-coincidence circuit.

2. Apparatus as in claim 1 in which the explosive has been seeded with a low activity source of radioactive cobalt-60, and in which said low level discriminators are connected to provide an output pulse for only those input pulses representing gamma ray energy greater than 1.0 m.e.v. and in which the high level discriminator is connected to provide an output pulse for only those input pulses representing gamma ray energy of greater than 1.5 m.e.v.

3. Apparatus as in claim 1 in which each of said tanks includes a transclucent material and includes a large surface area facing said pathway and in which said surface area is substantially larger than the opposing surface area of the person or luggage moving down the pathway.

4. Apparatus as in claim 1 in which said tank is made of a transclucent material and contains only liquid scintillation solvents and solutes thereby eliminating contamination of the liquid and means including one of said solutes for increasing the wavelength of the wave length of the scintillation light for improved light transmission efficiency, and means including said photomultipliers for providing maximum electrical output at the light wavelength as so increased.

5. Apparatus as in claim 1 in which said solvent is decahydronaphthalene said solutes include 2,5 diphenyloxazole 1,4 - bis[2-(4-methyl-5-phenyloxazole)]benzene, and p-terphenyl and in which the photomissive cathodes have a peak response at approximately 4300 Angstroms and are coupled to said tank by a silicone grease.

References Cited by the Examiner

UNITED STATES PATENTS

| 3,170,884 | 2/1965 | Macklin | 250—71.5 X |
| 3,221,166 | 11/1965 | Allenden | 250—83.3 |
| 3,225,194 | 12/1965 | Sprokel | 250—83.3 X |
| 3,255,352 | 6/1966 | Johnston | 250—71.5 X |

RALPH G. NILSON, *Primary Examiner.*

A. B. CROFT, *Assistant Examiner.*